Dec. 1, 1925.  
E. P. ARMSTRONG  
1,563,462  
STOP GAUGE FOR SETTING ANVILS OF SAW SWAGES  
Filed Sept. 5, 1922
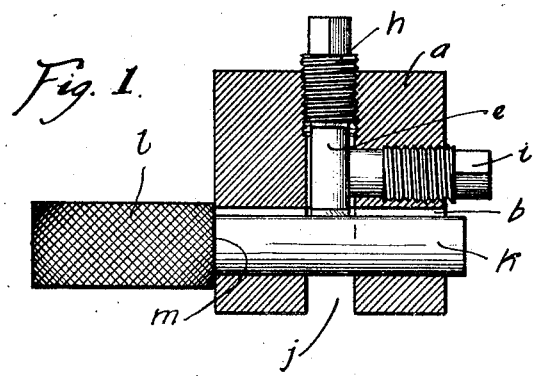
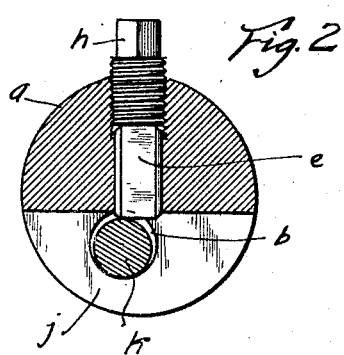
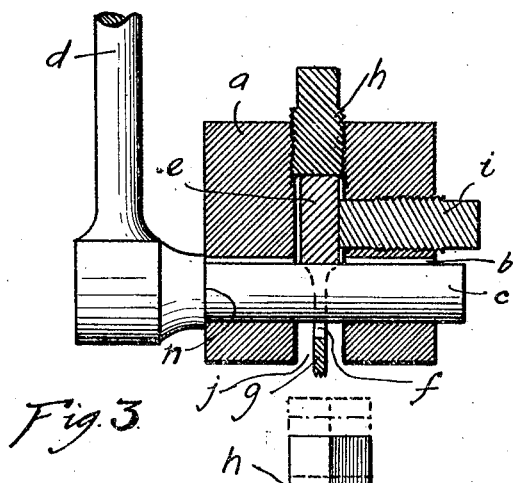
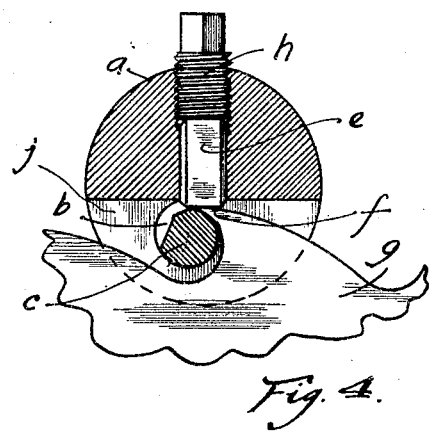
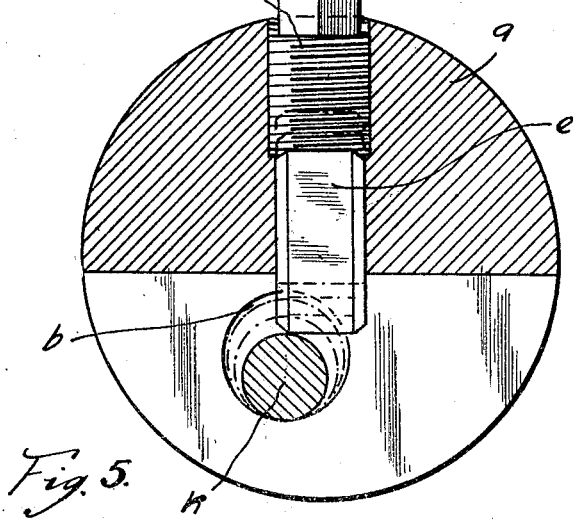
Inventor:  
Edward P. Armstrong  
by J. Geisler  
Atty.

Patented Dec. 1, 1925.

1,563,462

UNITED STATES PATENT OFFICE.

EDWARD P. ARMSTRONG, OF PORTLAND, OREGON.

STOP GAUGE FOR SETTING ANVILS OF SAW SWAGES.

Application filed September 5, 1922. Serial No. 586,197.

*To all whom it may concern:*

Be it known that I, EDWARD P. ARMSTRONG, a citizen of the United States, and a resident of Portland, county of Multnomah, and State of Oregon, have invented a new and useful Improvement in Stop Gauges for Setting Anvils of Saw Swages, of which the following is a specification.

My stop gauge is especially designed for use with saw swaging devices of the type illustrated in my Letters Patent of the United States, dated Feb. 18, 1908, and numbered 879,352, and also illustrated in my application for patent which is now pending in the Patent Office filed Oct. 17, 1921, under Serial No. 508,137.

As apparent, the essential features of a saw swage of this character are, a slotted head adapted for receiving a section of the saw and provided with a transverse bore intersecting said slot of the head, an anvil adjustable in the slot so as to project a predetermined accurate distance into said bore, and an eccentric die inserted and adapted to be rotated in said bore, and in so doing to pinch the point of the saw tooth against the anvil, and thus upset and broaden the point so as to give it the required shape for working efficiently. In other words, the point of the saw tooth is swaged to the desired degree by the spacing of the rotatable die and the anvil in relation to each other. The distance separating these two members accurately measures the degree of swaging of the point of the saw tooth. Since all of the teeth of the saw must be swaged uniformly and the degree of swaging must be varied relatively to the work to be done, a series of stop gauges must be provided for accurately determining the position of the anvil relatively to the swaging surface of the die. Furthermore in extended operation the anvil and eccentric die becomes worn and hence must be readjusted frequently. Heretofore the adjustment of the anvil was not always accurate because the anvil was set by the fractional turns of the set-screw and consequently such setting required the attention of a highly skilled filer. Furthermore, when the anvil has been reground the relative lengths between the set-screw and the anvil is changed and the latter must again be accurately reset. The accuracy of the set of the anvil should also be gauged occasionally while operating on different teeth of the saw to assure that they all are properly and uniformly swaged.

I attain the object of my invention by providing a stop-gauge consisting of a rod-like piece, preferably of cylindrical form, and provided with a portion constituting a stop against which the anvil of the saw swage may be set, thereby to limit accurately the degree the die may be rotated in the saw-swaging operation relatively to the angle the plane of the face of the throat of the saw-tooth shall make with the plane of its back, at its point. Preferably I provide said stop-gauge with a shoulder located to bring said stop-constituting portion in registration with said anvil.

Thus the correct position of the anvil relatively to the work to be done may be determined by setting the anvil firmly against the stop gauge and tightening the same in place. This adjustment will be accurate regardless of any wear in the parts or in the bottom of the bore in which the swaging die operates, inasmuch as my stop gauge is approximately of the same dimensions as the swaging die, and occupies substantially the same position as the latter in said bore.

I have illustrated the construction and operation of my gauge in the accompanying drawings, in which:

Fig. 1 is a diagrammatic cross section of a saw swage taken longitudinally thru the bore provided in the head for the die, and shows the relation between the anvil and my stop gauge;

Fig. 2 is a diagrammatic longitudinal section taken thru the swage head in a plane extending across said bore, and shows how the anvil projects slightly into the bore in which the swaging die bears, and illustrates how my stop gauge facilitates the accurate setting of the anvil;

Fig. 3 is a similar section to Fig. 1 except that my stop gauge has been removed and shows instead the swage die and the saw tooth being swaged;

Fig. 4 is a similar section to Fig. 2 but illustrates that the stop gauge could be made with one side slightly flattened relatively to the distance the anvil is to be set into the bore of the swage head; and Fig. 5 is another section like Fig. 2, but on a larger scale, illustrating that a number of stop gauges could be provided, each of a cross section corresponding to the distance the anvil shall be set into the bore of the swage head.

The saw swage for which I have designed my setting gauge consists of a head $a$ thru which extends transversely a hole $b$ in which is inserted and operated the rotatable die $c$. The die is rotated by its handle $d$ and co-operates with the anvil $e$ to swage the tooth $f$ of the saw $g$. The vertical set-screw $h$ regulates the distance which the anvil $e$ is set into the bore $b$. The horizontal set-screw $i$ holds the anvil in the desired position to which it is set by the vertical set-screw $h$. The head $a$ is slotted as at $j$ and straddles a section of the saw-blade $g$, the tooth $f$ of which projects between the anvil $e$ and the rotatable die $c$. My stop-gauge $k$ is made with a knurled handle $l$ which is preferably made larger in diameter than the die proper and thus a shoulder $m$ is formed which fits against the side of the die head $a$. This shoulder forms a stop which causes the stop-gauge to be set exactly in the same position each time. While my stop-gauge is preferably made cylindrical, it could instead be made with one side slightly flattened, as illustrated in Fig. 4 to provide the stop-surface against which the anvil may be set. The anvil $e$ is set by the gauge $k$ in the following manner:

The anvil may in the first instance be positioned so that it does not project into the hole $b$. Then the gauge $k$ is inserted. The anvil is then adjusted so that it bears firmly on my stop-gauge and then is fixed in place by the set-screw $i$. The stop-gauge is then removed and the eccentric die $c$ put in place and operated as usual. My stop-gauges are preferably made in sets of different sizes so that the saw teeth can be made with a long or short bite to suit the particular work.

I claim:

1. A stop-gauge for a saw-swage of the character described, consisting of a rod-like piece adapted to be inserted in the bore of the head for the die of the saw swage, and provided with a portion constituting a stop against which the anvil of the saw-swage may be set, thereby to limit accurately the degree the die may be rotated in the saw-swaging operation relatively to the angle the plane of the face of the throat of the saw tooth shall make with the plane of its back at its point.

2. The stop-gauge set forth in claim 1 distinguished in that the stop-gauge is provided with a shoulder located to bring said stop-constituting portion in registration with said anvil.

3. The stop-gauge set forth in claim 1 distinguished in that it consists of a cylindrical piece.

EDWARD P. ARMSTRONG.